United States Patent
Xuan et al.

(10) Patent No.: US 6,416,839 B1
(45) Date of Patent: Jul. 9, 2002

(54) MAGNETIC RECORDING MEDIUM WITH LASER-FORMED DIFFERENTIAL ZONE LUBRICATION

(75) Inventors: Jialuo Jack Xuan, Milpitas; Chung-Yuang Shih, Cupertino; Xiaohua Shel Yang, Fremont; Youming Liu, Palto Alto; Vidya K. Gubbi, Milpitas, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/797,986

(22) Filed: Mar. 5, 2001

Related U.S. Application Data

(62) Division of application No. 09/311,366, filed on May 13, 1999, now Pat. No. 6,221,442.
(60) Provisional application No. 60/086,034, filed on May 19, 1998.

(51) Int. Cl.[7] .................................................. G11B 5/82
(52) U.S. Cl. .............................. 428/65.4; 428/694 TP; 428/156; 428/900; 360/135
(58) Field of Search ........................ 428/65.4, 694 TP, 428/156, 900; 360/135

(56) References Cited

U.S. PATENT DOCUMENTS 5,674,582 A * 10/1997 Eltoukhy et al. .......... 428/65.4

* cited by examiner

Primary Examiner—Stevan A. Resan
(74) Attorney, Agent, or Firm—McDermott, Will & Emery

(57) ABSTRACT

Stiction failure of a magnetic recording medium is reduced by forming a lubricant topcoat having a first thickness over the landing zone greater than a second thickness over the data zone, with a sharp transition step having an angle of at least about 70° with respect to a line perpendicular to the surface. Embodiments include depositing a lubricant topcoat at a substantially uniform thickness and reducing the thickness of the lubricant topcoat over the data zone by about 20% to about 80% employing a laser light beam to volatilize the lubricant.

8 Claims, 2 Drawing Sheets

MAGNETIC RECORDING MEDIUM WITH LASER-FORMED DIFFERENTIAL ZONE LUBRICATION

RELATED APPLICATIONS

This application is a Divisional of application Ser. No. 09/311,366 filed May 13, 1999, Pat. No. 6,221,442.

This application claims priority from Provisional Patent application Serial No. 60/086,034 filedMay 19, 1998, the entire disclosure of which is hereby incorporated by reference herein.

TECHNICAL FIELD

The present invention relates to a method of manufacturing a magnetic recording medium having a lubricant topcoat which exhibits improved tribological performance and reduced stiction failures. The present invention has particular applicability in manufacturing magnetic recording media suitable for high density recording and long term magnetic performance stability.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques include laser texturing the surface of a non-magnetic substrate to provide a textured landing zone in which a magnetic head can land when the drive is not in use, and can take off when the drive is reading and writing data. Typically, the surface of the non-magnetic substrate is polished to a specular finish prior to laser texturing to form the landing zone leaving a substantially smooth data zone. Subsequently, an underlayer, a magnetic layer, a protective overcoat and a lubricant topcoat are sequentially deposited, wherein the textured surface on the substrate is intended to be substantially replicated in the subsequently deposited layers. Typical substrate materials include an aluminum alloy with a layer of amorphous nickel phosphorous thereon, glasses, ceramics and glass-ceramic materials, as well as graphite. Underlayers typically comprise chromium or a chromium alloy, while the magnetic layer typically comprises a cobalt based alloy. Protective overcoats typically contain carbon. Such layers are typically deposited by sputtering techniques preformed in an apparatus containing sequential deposition chambers.

In accordance with conventional practices, a lubricant topcoat is uniformly bonded to the protective overcoat. The lubricant topcoat applied to the protective overcoat performs several functions. The lubricant topcoat improves tribological performance for reduced friction, stiction and crash rate at the head-disk-interface. In addition, a lubricant topcoat prevents wear between the disk and head interface during drive operation. Excessive wear of the protective overcoat increases friction between the head and disk, thereby causing catastrophic drive failure. In addition, the lubricant topcoat prevents the protective overcoat from corrosion and other damage, thereby providing long-term magnetic performance stability.

Excess lubricant at the head-disk interface causes high stiction between the head and disk. If stiction is excessive, the drive cannot start and catastrophic failure occurs. Accordingly, the lubricant thickness must be optimized for stiction and friction.

Conventional practices in texturing the substrate, e.g., a non-magnetic substrate or underlayer provided thereon, comprise decoupling the magnetic requirements (data zone on which information is recorded and read) from the mechanical requirements (landing zone), by forming a dedicated landing zone where the slider is parked and lands after the drive has been shut down. Adverting to FIG. 1, a conventional magnetic recording disk 10 for a Winchester hard-drive design comprises an inner annular landing zone 11 and an outer annular data zone 12. As a result of such zone design, the thickness of the lubricant topcoat is typically optimized for improved tribological performance and reduced friction, stiction and crash rate at the head-disk interface. Accordingly, the thickness required for the landing zone, which undergoes a large number of head-disk contacts, is required to be greater than the thickness of the lubricant topcoat overlying the data zone, where only a thin continuous lubricant layer is required to prevent corrosion and damage to the underlying protective overcoat thereby ensuring long-term magnetic performance stability.

However, conventional methods for forming a lubricant topcoat in the magnetic media industry, such as "dip-lube", "vapor-lube" and "spray-lube", are only capable of forming a lubricant topcoat at a substantially uniform thickness across the entire disk surface without differentiating the lubricant thickness between the different radial zones, i.e. landing zone and data zone. The conventional practice of depositing a lubricant topcoat at a uniform thickness overlying both the data zone and landing zone is problematic. For example, upon applying a thick lubricant topcoat for improved tribological performance, fly-stiction occurs as a result of lubricant transferred to the head when it flies over the data zone, and lubricant is transferred from the head to the head-disk interface when it rests at the landing zone, thereby causing stiction failure.

Prior attempts to achieve differential zone lubrication have not met with particular success. One prior attempt comprises the use of a tape containing a chemical for buffing or removing a portion of the lubricant from over the data zone. This technique, however, has been found problematic due to the generation of contaminant particles. Another prior attempt comprises selectively sputtering lubricant through a ring-type nozzle over the landing zone. However, this technique does not provide any lubricant at all over the data zone which leaves the resulting magnetic recording medium susceptible to corrosion. In addition, the edge position of the lubricant at the junction between the landing zone and the data zone is very difficult to control. Moreover, complex and costly equipment is required.

A variation of the sputtering technique comprises initially sputtering a thin lubricant layer over the entire surface to protect the data zone from corrosion and then selectively sputtering an additional layer of lubricant on the landing zone for CSS. While this alternative technique may provide corrosion protection for the data zone, it is still difficult to control the junction between the landing zone and the data zone, thereby forming a transition zone having an angle of no greater than 30° with respect to a perpendicular line to the surface of the magnetic recording medium. In addition, costly and expensive equipment is required.

Accordingly, there exists a need for a method of manufacturing a magnetic recording medium with a lubricant topcoat having a differential thickness such that the thickness of the lubricant topcoat overlying the landing zone is greater than the thickness of the lubricant topcoat overlying the data zone, with a sharp transition therebetween.

DISCLOSURE OF THE INVENTION

An advantage of the present invention is a magnetic recording medium having a lubricant topcoat with a thickness optimized for tribological performance with reduced fly-stiction.

A further advantage of the present invention is a magnetic recording medium having a differential zone lubrication thicknesses with a sharply delineated junction between the data zone and the landing zone.

Another advantage of the present invention is a method of manufacturing a magnetic recording medium having a lubricant topcoat with a thickness optimized for tribological performance with reduced fly-stiction.

Additional advantages and other features of the present invention will be set forth in part in the description which follows and in part will become apparent to those having ordinary skill in the art upon examination of the following or may be learned from the practice of the invention. The advantages of the present invention may be relied and obtained as particularly pointed out in the appended claims.

According to the present invention, the foregoing and other advantages are achieved in part by a method of manufacturing a magnetic recording medium, the method comprising: applying a lubricant topcoat at a first thickness on a surface of a composite containing a magnetic layer on a non-magnetic substrate, the surface of the composite having a data zone and a landing zone; and reducing the first thickness of the lubricant topcoat over the data zone to a second thickness by volatilizing a portion of the lubricant such that the thickness of the lubricant topcoat over the landing zone is greater than the second thickness.

Another aspect of the present invention is a magnetic recording medium comprising: a non-magnetic substrate with a surface having a landing zone and a data zone; a magnetic layer on the surface of the non-magnetic substrate, wherein the landing zone and data zone are substantially reproduced on the magnetic layer; a lubricant topcoat on a magnetic layer, the lubricant topcoat having a first thickness over the landing zone and a second thickness over the data zone, wherein the first thickness is greater than the second thickness; and a step between the first thickness and the second thickness having an angle of about 70° to about 90° with respect to a line perpendicular to the surface.

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

The present invention addresses and solves problems stemming from the conventional practices of depositing a lubricant topcoat at a substantially uniform thickness, optimized for tribological performance over both the landing zone and data zone. Such problems include fly-stiction due to the transfer of lubricant to the head while flying over the data zone, and subsequent lubricant transfer from the head to the disk interface in the landing zone resulting in stiction failure.

The present invention also overcomes the problems attendant upon prior attempts at differential zone lubrication by forming a sharp transition zone or step in the lubricant topcoat between the landing zone and the data zone having an angle of about 70° to about 90° with respect to a line perpendicular to the surface, e.g., about 80° to about 90°.

Figure 1:
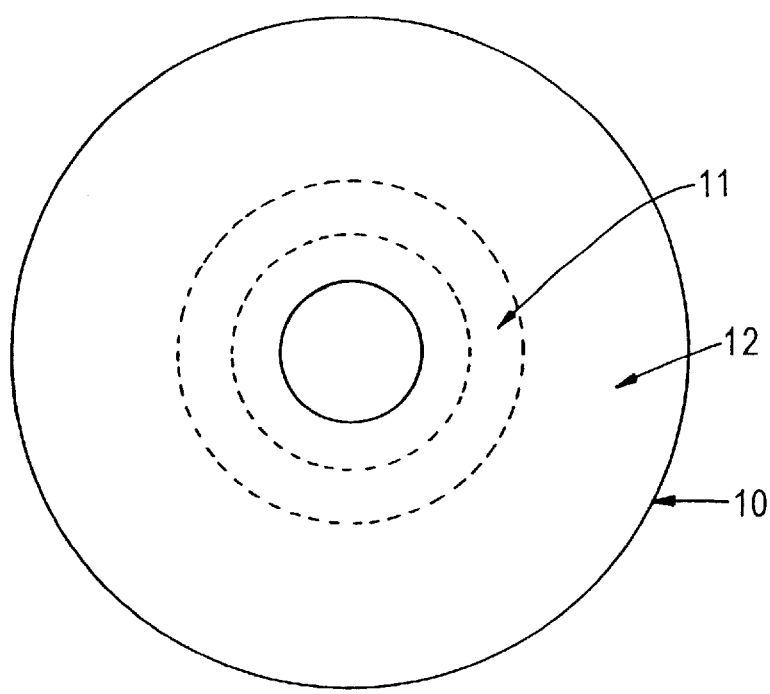
FIG. 1 schematically illustrates a conventional two zone magnetic recording disk.

In accordance with the present invention, a lubricant topcoat is formed on a conventional composite, comprising a magnetic recording layer on a non-magnetic substrate, the surface of which contains a data zone and landing zone, such as that depicted in FIG. 1. However, the present invention departs from conventional practices by forming the lubricant topcoat at a differential thickness by selectively volatilizing a portion of the lubricant such that the thickness of the lubricant topcoat over the landing zone is optimized for tribological performance, while the thickness of the lubricant topcoat over the data zone is reduced vis-à-vis the thickness of the lubricant topcoat over the landing zone to a degree sufficient to protect the underlying layer thereby ensuring long-term magnetic performance stability. In this way, the head can fly at a relatively lower flying height over the data zone with an attendant reduction in lubricant transferred to the head thereby reducing stiction failure.

Embodiments of the present invention include selectively volatilizing a portion of the lubricant over the data zone by impinging a laser light beam thereon. Advantageously, the use of a laser light beam enables the formation of a sharp transition or step in the lubricant topcoat between the data zone and the landing zone, unlike the prior buffing and sputtering techniques, thereby advantageously conserving recording area. The use of a laser light beam enables the formation of a sharp transition in lubricant thickness between the landing zone and the data zone having a step with an angle of about 70° to about 90° with respect to a line perpendicular to the surface, e.g., about 80° to about 90°.

Embodiments of the present invention include reducing the thickness of the lubricant topcoat over the data zone by about 20% to about 80% of the originally deposited thickness. For example, embodiments of the present invention comprise depositing a lubricant topcoat at a substantially uniform thickness of about 8 Å to about 50 Å, such as about 15 Å to about 30 Å, and then selectively reducing the thickness of the lubricant topcoat over the data zone by about 20% to about 80% of the originally deposited thickness, leaving the lubricant topcoat with a thickness over the landing zone greater than that over the data zone.

Embodiments of the present invention comprise reducing the thickness of the lubricant topcoat over the data zone by vaporizing the lubricant over the data zone, as by impinging a laser light beam thereon. Embodiments of the present invention include rotating the disk while linearly traversing the surface of the lubricant topcoat in an axial direction with a laser light beam to vaporize the lubricant over the data zone thereby reducing lubricant thickness. For example, embodiments of the present invention include rotating the disk at about 50 to about 800 rmp, e.g., about 100 to about 500 rpm, while selectively linearly traversing the surface of the lubricant topcoat over the data zone with an impinging laser light beam in an axial direction toward the outer diameter at a linear speed of about 0.001 to about 0.01 inches per second, e.g., about 0.002 to 0.004 inches per second.

The use of laser light beam to reduce the thickness of the originally deposited lubricant topcoat over the data zone enables precise control of the zone location and lubricant thickness, thereby providing a magnetic recording disk surface with a thicker lubricant at the designated landing zone for extending wear life and a thinner lubricant coating at the designated data zone for reduced fly-stiction failure. Thus, the present invention includes depositing a lubricant topcoat at a first substantially uniform thickness across the entire disk surface, which first thickness is designed for optimum tribological performance, i.e., head-disk-interface stiction/wear requirements. The thickness of the deposited lubricant topcoat is then selectively reduced employing a laser light beam over the data zone for reduced fly-stiction failures.

In accordance with the present invention any of various types of laser light beams can be employed, such as a continuous-wave form (CW) laser or a pulsed-wave form (pulsed) laser, as with a laser light beam having a wavelength of about 0.4 $\mu$m to about 10 $\mu$m, e.g., about 1 $\mu$m. For example, a laser light beam is initially focused at the disk surface at the inner radius of the data zone. The disk is then rotated and the focused laser light beam is linearly traversed in a radial direction towards the outer diameter at an appropriate linear speed until traversing the entire data zone. The focused laser light beam provides accurate energy to vaporize a desired amount of lubricant on the disk surface to generate an accurately controlled thinner lube layer over the data zone. The optimum parameters for achieving a desired thickness of the lubricant topcoat over the data zone can be readily redetermined in a particular situation. For example, the amount of lubricant vaporized by the laser light beam depends on various parameters, such as the laser beam wavelength, the laser peak energy and average energy, the speed of the laser beam movement and the lubricant itself.

The present invention is applicable to forming a lubricant topcoat on any of various conventional magnetic recording medium structures comprising a non-magnetic substrate, an underlayer thereon, a magnetic layer, e.g., a cobalt-based alloy, on the underlayer, and a protective overcoat, typically a carbon-containing protective overcoat, on the magnetic layer. Various structural modifications can be employed, as by employing plural underlayers below and intermediate layers above the magnetic layer. The materials and method of forming a conventional magnetic recording medium structure are well known and, hence, not set forth herein in detail.

Any of various conventional lubricant topcoat materials can be employed in practice of the present invention, such as conventional perfluro polyethers. In addition, the lubricant topcoat encompassed by the present invention can be applied by any of various conventional techniques, including thermal treatment and ultraviolet irradiation and sulking. Embodiments of the present invention comprise applying a lubricant topcoat on a magnetic recording medium structure having a surface containing a landing zone and a conventional smooth data zone, as well as a laser textured data zone, such as that disclosed in copending application Ser. No. 08/972,229 U.S. Pat. No. 6,021,032 filed on Nov. 17, 1997, the entire disclosure of which is hereby incorporated herein by reference.

Figure 2:
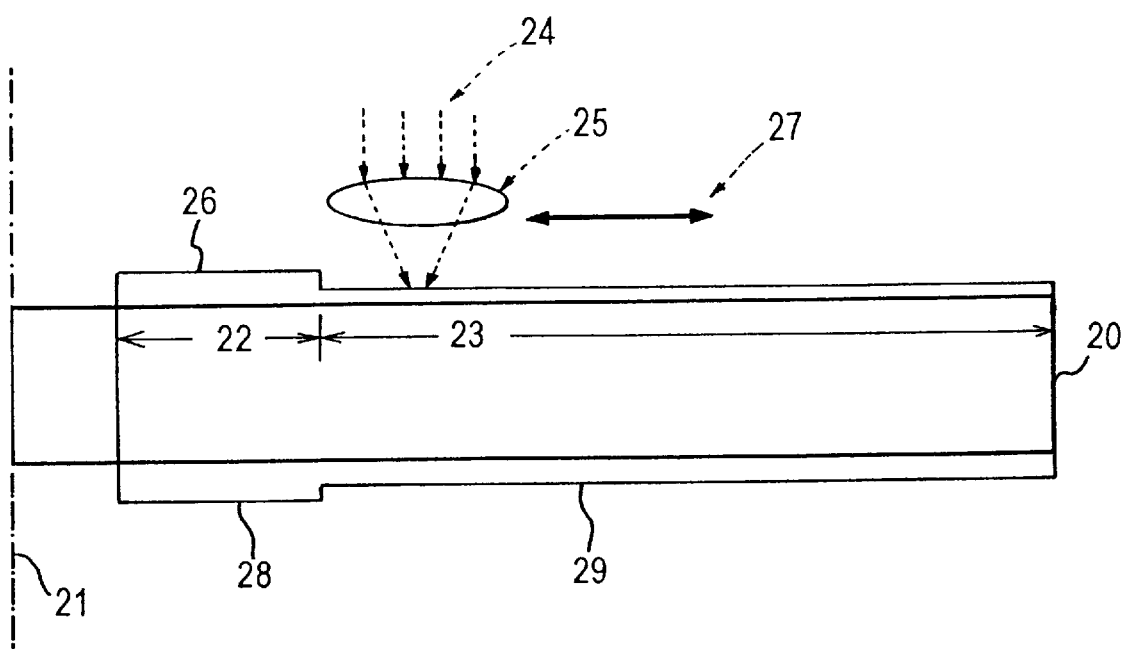
FIG. 2 schematically illustrates an embodiment of the present invention.

An embodiment of the present invention is schematically illustrated in FIG. 2, wherein a portion of magnetic recording disk 20 rotated about disk center line 21, as on a spindle (not shown) typically employed when laser texturing a landing zone. The portion of disk 20 containing the landing zone is designated by reference numeral 22, while reference numeral 23 designates the data zone surface portion. A laser light beam 24, such as a CW laser or a pulsed laser, is passed through a focusing lens 25 and impinged on lubricant topcoat 26 while linearly traversing the surface of the lubricant topcoat in a radial direction as shown by arrows 27. The resulting lubricant topcoat exhibits a greater thickness 28 over the landing zone 22 than the thickness 29 over the data zone 23.

EXAMPLE

A ZDOL®-type lubricant, i.e., a conventional perfluro polyether alcohol lubricant, as marketed by Ausimont, USA, located in Thorofare, N.J., was applied to a conventional magnetic recording medium structure containing a carbon-containing protective overcoat at a substantially uniform thickness. A YAG laser having a wavelength of 1.064 $\mu$m and CW mode was impinged on the disk surface at a laser power of 1.31W to 1.98W with a focused beam diameter of about 25 $\mu$m. The disk was rotated at 640 rpm with linear motion along the radial direction of the laser light beam across the data zone at 0.002 inches per second during laser treatment.

Figure 3:
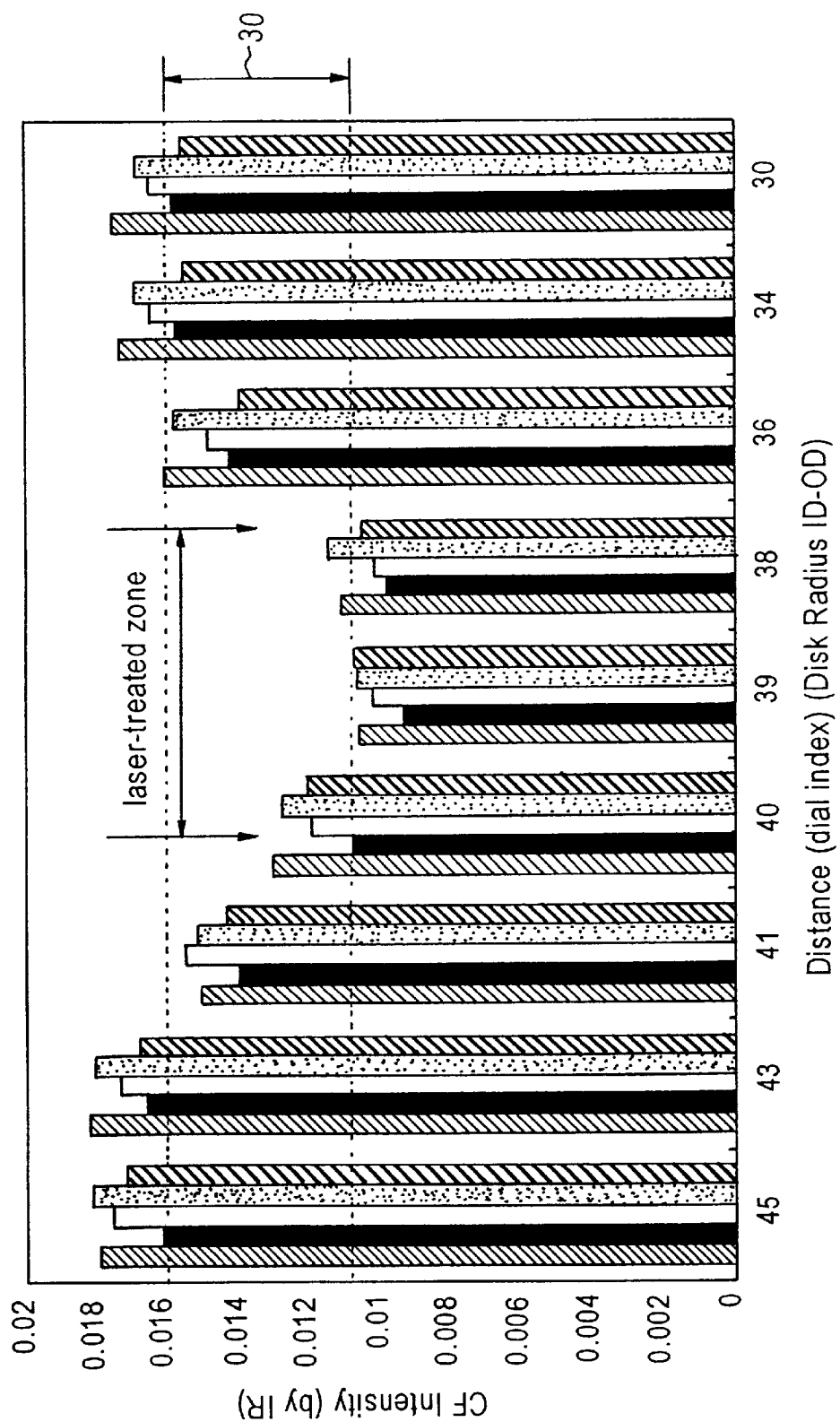
FIG. 3 illustrates actual reduction lubricant thickness employing a laser light beam.

The resulting FTIR, which is directly related to the lube thickness, was plotted along the radial direction and appears in FIG. 3. It is apparent that the dip thickness has a CF absorption, 0.07 vs. the untreated area 0.017. The CF absorption intensity of the laser treated zone is 40% lower than that of adjacent positions for five different powers as shown by reference numeral 30. The width of the dip equals the width of the radial band treated by the laser light beam.

This example illustrates the use of a laser light beam to reduce the thickness of a lubricant topcoat in a selected area.

For illustrative purposes, a central radial band was selected for exemplification. It should, however, be apparent that in practicing embodiments of the present invention, the entire surface of the lubricant topcoat overlying the data zone is selectively subject to laser treatment for reduced thickness vis-à-vis the lubricant topcoat over the landing zone.

In practicing the present invention, the non-magnetic substrate can be any substrate typically employed in the manufacture of recording media, such as a metal substrate or an alternative substrate comprising a glass, ceramic or glass-ceramic material or a plastic. Other conventional substrates include aluminum alloy substrates with a coating thereon, such as nickel-phosphorous. It should be understood that embodiments of the present invention include texturing opposite surfaces of a conventional non-magnetic substrate to provide a laser textured landing zone and/or laser textured data zone, with subsequent deposition of plurality of layers on both sides of the substrate. In accordance with the present invention, the lubricant topcoat is applied to opposite surfaces of a conventional magnetic recording disk structure and the thickness of the lubricant topcoat on both sides reduced over the data zone, as by laser treatment.

The magnetic layers deposited in accordance with the present invention can be any of those conventionally employed in the production of magnetic recording media, such as cobalt-based alloys. The thickness of the magnetic layers is consistent with conventional practices, e.g., about 100 Å to about 1,000 Å. As in conventional practices, one or more underlayers can be deposited on the textured substrate prior to depositing the magnetic layer. Typical underlayers include chromium or chromium alloys, such as chromium-vanadium or chromium-titanium, oxygen-doped chromium, tungsten or a tungsten alloy. Conventional protective overcoats employed embodiments of the present invention include carbon overcoats. The underlayers, magnetic layers and protective overcoats can be applied in a conventional manner, as by any of various sputtering techniques, deposited at conventional thicknesses employed in the production of recording media.

The present invention can be employed to produce any of various types of magnetic recording media, including thin film disks, with an attendant improvement in tribological performance and reduced fly-stiction. The present invention enjoys industrial applicability in the manufacture of any of various types of magnetic recording media, particularly high aerial recording density magnetic recording media.

Only the preferred embodiment of the invention and but a few examples of its versatility are shown and described in the present disclosure. It is to be understood that the present invention is capable of use in various other combinations and environments, and is capable of changes or modifications within the scope of the inventive concept as expressed herein.

What is claimed is:

1. A magnetic recording medium comprising:
   a non-magnetic substrate with a surface having a landing zone and a data zone;
   a magnetic layer on the surface of the non-magnetic substrate, wherein the landing zone and data zone are substantially reproduced on the magnetic layer;
   a lubricant topcoat on a magnetic layer, the lubricant topcoat having a first thickness over the landing zone and a second thickness over the data zone, wherein the first thickness is greater than the second thickness; and
   a sharply delineated junction between the first thickness and the second thickness.

2. The magnetic recording medium according to claim 1, wherein the sharply delineated junction is a step which extends from the first thickness to the second thickness.

3. The magnetic recording medium according to claim 2, wherein the step extends from the first thickness to the second thickness at an angle of about 70° to about 90°.

4. The magnetic recording medium according to claim 3, wherein the step extends from the first thickness perpendicular to the second thickness.

5. The magnetic recording medium according to claim 3, wherein the step extends from the first thickness to the second thickness at an angle of about 80° to about 90°.

6. The magnetic recording medium according to claim 1, wherein:
   the first thickness is about 8 Å to about 50 Å; and
   the second thickness is about 20% to about 80% of the first thickness.

7. The magnetic recording medium according to claim 1, further comprising a protective overcoat on the magnetic layer, wherein the landing zone and data zone are substantially reproduced on the protective overcoat, and the lubricant topcoat is on the protective overcoat.

8. The magnetic recording medium according to claim 1, further comprising a non-magnetic underlayer between the non-magnetic substrate and magnetic layer.

* * * * *